(12) United States Patent
Khoury (10) Patent No.: US 6,631,017 B2
(45) Date of Patent: Oct. 7, 2003

(54) MATCHED AMPLIFICATION AND SWITCH JOINT TRANSFORM CORRELATOR

(76) Inventor: Jed Khoury, 33 Tan Bark Rd., Sudbury, MA (US) 01776

(*) Notice: Subject to any disclaimer, the term of this patent is extended or adjusted under 35 U.S.C. 154(b) by 0 days.

(21) Appl. No.: 09/973,997

(22) Filed: Oct. 9, 2001

(65) Prior Publication Data
US 2002/0060841 A1 May 23, 2002

Related U.S. Application Data

(60) Provisional application No. 60/239,836, filed on Oct. 12, 2000.

(51) Int. Cl.[7] ............................................. G03H 1/16
(52) U.S. Cl. ........................... 359/29; 359/559; 359/561
(58) Field of Search ........................ 359/29, 561, 559, 359/560; 382/210, 211, 278, 280

(56) References Cited

U.S. PATENT DOCUMENTS 5,376,807 A * 12/1994 Liu et al. ................... 359/561
5,598,485 A * 1/1997 Kobayashi et al. ......... 382/278
5,619,596 A * 4/1997 Iwaki et al. ................ 359/559

* cited by examiner

Primary Examiner—Georgia Epps
Assistant Examiner—M. Hasan
(74) Attorney, Agent, or Firm—Robert Nathans (57) ABSTRACT

A matched amplification correlator transforms input images projecting a real time hologram upon a holographic storage device and a spatial light modulator, optically coupled to the storage device, modulates the hologram with a correlation filter, and the modulated signal is Fourier transformed to produce an output correlation signal. Alternatively, Fourier transforms of beams bearing the signals to be correlated are projected upon a beam controlled semi-conductor absorption modulator for selectively switching the Fourier transform of the noisy cluttered image through the device, and a spatial light modulator, modulates the hologram with a correlation filter, and the transform produces an output correlation signal. These compact adaptive, noise robust correlators can be made as small as one cubic centimeter. In a correlation system of exemplary figure one, nearly one hundred million correlations per second (0.1 Ghz) are possible. Front end components of the correlators can be used to clean noisy images.

20 Claims, 7 Drawing Sheets

MATCHED AMPLIFICATION AND SWITCH JOINT TRANSFORM CORRELATOR

This application claims the benefit of provisional application No. 60/239,836 filed Oct. 12, 2000.

BACKGROUND OF THE INVENTION

The present invention relates to the field of optical correlator and image clean up and devices. Correlators have been under extensive study for more than a decade, due to their significance in various applications of science and technology. They have been proposed for use in a variety of application such as security, finger print identification and machine vision (H. Rajbenbach, S. Bonn, P. Refregier, P. Joffre, J. P. Huignard, H. S. Jensen and E. Rasumussen, "*Compact photorefractive correlator for robotics applications,*" Appl. Opt. 31, 5666–5647 (1992) and tracking(Allen Pu, Robert Denkewalter and Demetri Psaltis "*Real-time vehicle navigation using holographic memory,*" Opt. Eng 10, 2737–2746, (1997). K. Curtis and D. Psaltis, "*3-dimensional disk based optical correlator,*" Opt. Eng. 33, 4051–4054 (1994).

So far, to my knowledge, three successful optical correlators have been built for this tracking purpose, The first is the TOPS one *TOPS optical correlation programLindell*, Scott D.; AA(Martin Marietta Astronautics Group) Publication: *Proc. SPIE Vol. 1958*, p. 7–18, *Transition of Optical Processors into Systems* 1993, David P. Casasent; Ed. The size of this correlator is less than a one cubic foot, and manages to correlate 800 correlation per/sec. For this correlation the binary phase-only filter was used in the correlation plane. This correlator proved its success in tracking. A more compact correlator was built by Cortec, Inc(11) at Burlington Mass. For this correlator quantum well photorefractive materials with response time of less than $\mu$sec time were used. The size of this correlator was the size of a hand and managed to correlate nearly 10,000 correlations per sec. A group in Caltech demonstrated an opto-electronic correlator which can correlate 30,000 correlation per/sec(K. Curtis and D. Psaltis, "*3-dimensional disk based optical correlator,*" Opt. Eng. 33, 4051–4054 (1994) This correlation system has been successful in real-time vehicle navigation. This correlation system uses a holographic data base of correlation filter stored on a DuPont HRF-150 photo polymer.

In accordance of the present invention, a design of a compact optical correlator with operating speed exceeds 1,000,000 correlation/sec is illustrated. Correlator with this massive capability can be used in variety of application involved a large data base for comparing such as finger print identification, information search on the Internet, DNA sequence codes. Templates for machine vision.

BRIEF SUMMARY OF THE INVENTION

Figure 3:
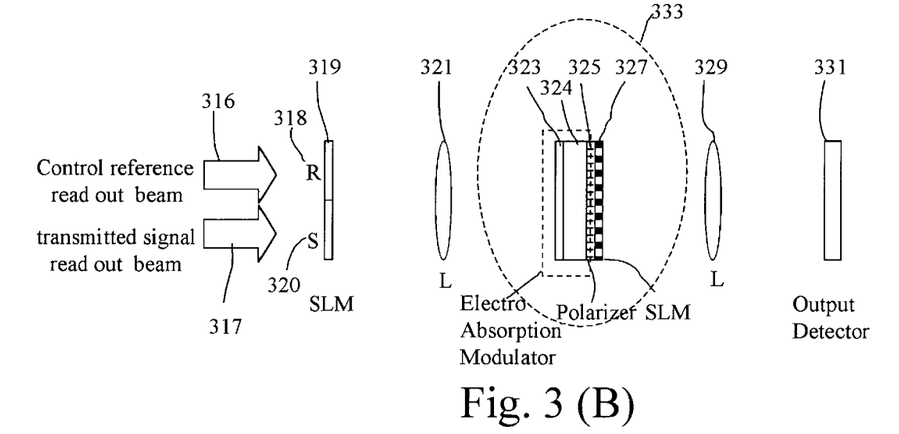
Figure 3A:
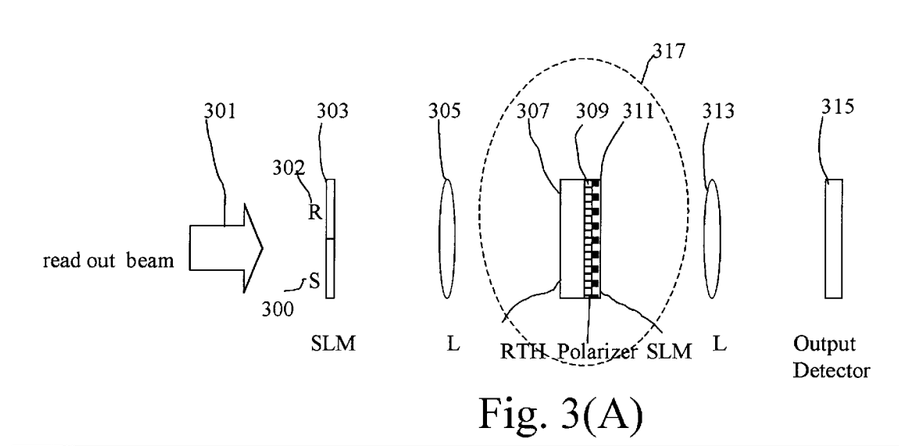

A matched amplification correlator of FIG. 3*a* for correlating a noisy cluttered weak signal image with a strong reference image is provided in a first embodiment of the invention, wherein Fourier transforms of these images produce a real time hologram upon a photorefractive holographic storage device and a spatial light modulator, optically coupled to the storage device, modulates the hologram with a correlation filter, and the modulated signal is Fourier transformed to produce an output correlation signal.

In a second, presently most preferred embodiment of FIG. 3*b*, overlapping Fourier transforms of beams bearing the signals to be correlated are projected upon a controlled absorption modulator having beam control III–V family semiconductor layers for selectively switching the Fourier transform of the noisy cluttered image through the device, and a spatial light modulator, optically coupled to the storage device, modulates the hologram with a correlation filter, and the resulting modulated signal is Fourier transformed to produce an output correlation signal. This embodiment can operate at extremely high speeds. As explained in the FIG. 1 description, assuming that 100 images are fed simultaneously from image input multiplexer 103 of FIG. 1 through an image rotator 113 into the compact correlator 123, it should be possible to achieve nearly one hundred million correlations per second (0.1 Ghz) if correlator 123 has a FIG. 3*b* configuration. The image cleaning processors of FIGS. 2(*b*) and 2(*d*) are useful standing alone for cleaning noisy cluttered images, and are advantageously used as front end apparatus' in connection with the inventive correlators of FIGS. 3(*a*) and 3(*b*) respectively.

DESCRIPTION OF THE DRAWINGS

The various features of the invention will become apparent upon study of the following description taken in conjunction with the drawing which:

FIG. 2: The architecture of (a) Photorefractive two-beam coupling (b) Matched-amplification with two-beam coupling (c) Optical switching via controlled absorption in semi conducting material (d) Matched-switching using controlled absorbtion modulator.

FIG. 3: Architectures which illustrates the structure of (a) The matched amplification JTC and (b) The matched-switch correlator.

FIG. 5: Slabs (a) A slab of a real-time hologram and a spatial light modulator (b) A salab of controllable absorber-spatial light modulator.

FIG. 6: The compact structure of the optical correlator

FIG. 7 The set-up for an image rotator (a) Using Dove prism, (b) Using the components within Dove prism (c) Using an image rotator based on acousto-optic modulators.

DETAILED DESCRIPTION OF THE INVENTION

Figure 1:
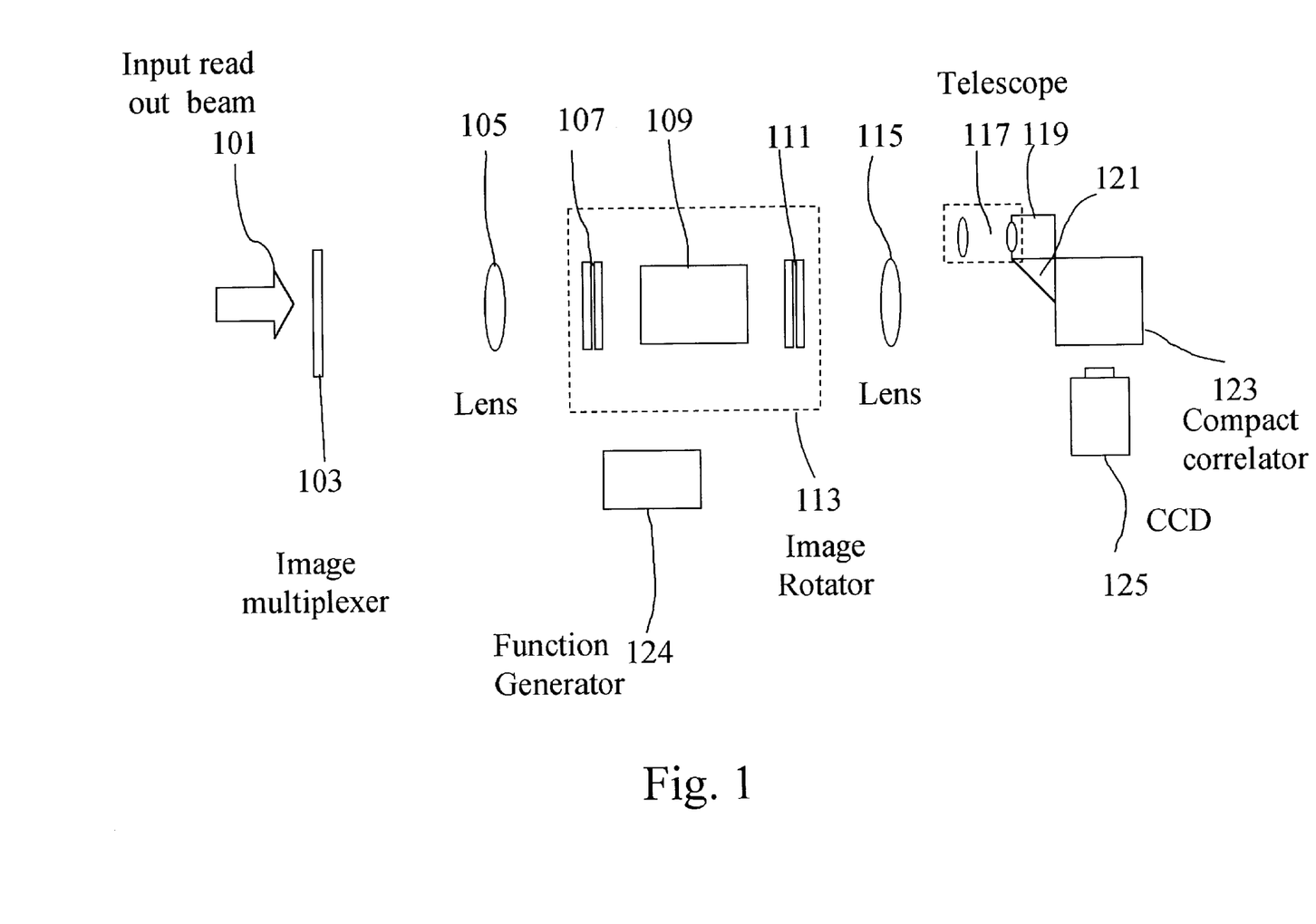
FIG. 1: A Schematic diagram of the compact holographic correlator.
Figure 2:
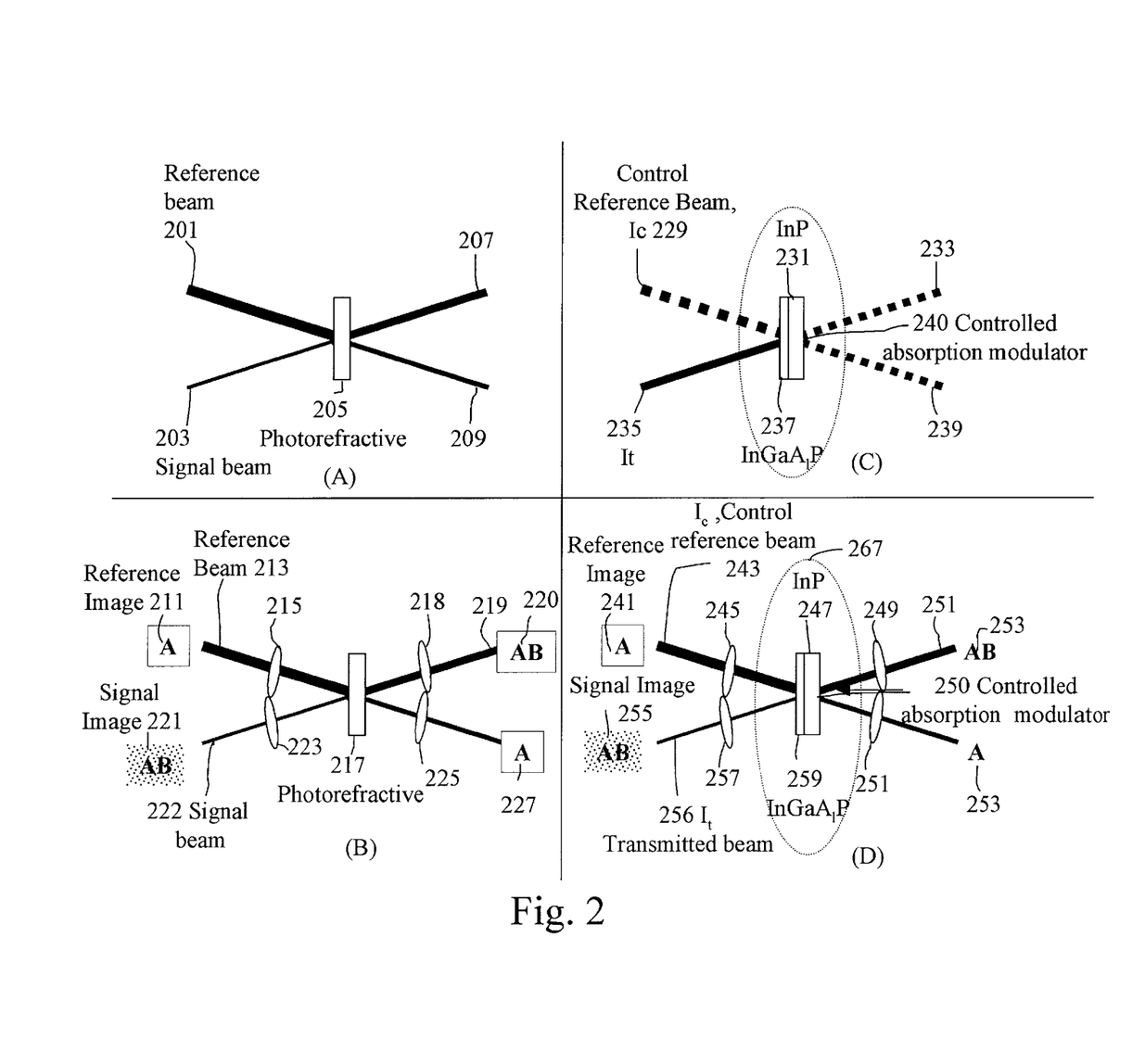

FIG. 1 shows a schematic diagram of the ultra fast compact correlation system. In this correlator the reference information (nearly one hundred images all super imposed one on top of the other and propagated in the same direction) is fed to the correlator from an image multiplexer 103. The image multiplexer can be either a holographic store or a spatial light modulator addressed optically or electronically. The image multiplexer stores images having various projection, rotation and scale of the target.

Before the reference information is fed up to the optical correlator, it is fed into an image rotator 113 (See Eung Gi Peak, Joon Y. Choe and Tae. K. Oh, John H. Hong and Tallis Y. Chang. "*Nonmechanical image rotation with an acousto-optic dove prism,*" Opt. Letts. 15, 1195–1197 (1997 which, consist of four components, 107, 109, 111, 124 discussed later in FIG. 3. This image rotator 113 rotates the multiplexed reference information in $\mu$sec time-scale. After the reference information is rotated then it is fed into a compact matched amplification-switch correlator 123. The out correlation is detected via a CCD 125 or a 2-D imaging detector.

The time-scale of the matched amplification-switch is in the range of msec-nsec. The image rotation can be achieved in μsec time (Eung Gi Peak, Joon Y. Choe and Tae. K. Oh, John H. Hong and Tallis Y. Chang. "Nonmechanical image rotation with an acousto-optic dove prism," Opt. Letts. 15, 1195–1197 (1997). Therefore, the number of correlations, which may be achieved in the matched correlation scheme is limited by the time-scale of image rotation. Assuming that one hundred images are fed simultaneously from the input image multiplexer 103 into the optical correlator, then it should be possible to achieve nearly one hundred million correlations per sec (0.1 Ghz correlation rate). In case of matched-amplification the number of correlations that can be achieved per sec is limited by the matched-amplification process. Therefore, the number of correlations which can be achieved per sec (assuming that a hundred images are fed from the spatial light modulator) is $10^5$ (0.1 Mhz).

Most of the components used in system's design it is well within the skill of the worker in the art. However, the matched amplification-switch joint transform (MASC) correlation is the heart of the new system's design. With out the MASC design, it would impossible to feed massive information and to process it in real-time. Therefore a special attention is given to the MASC's design and its compact versions. However, in order to understand how the whole system operates we need to explain the operational principle of the components in the system.

In this invention, the operational principles of the following devices are going to be discussed (1) Matched amplification via photorefractive two-beam coupling (2) Matched-switching via InGaAsP controlled absorption absorption modulator (3) The relation between matched-amplification and matched-switching and Wiener filtering. (4) Matched-amplification and matched-switch joint-transform correlator (5) Franz-Keldysh spatial light modulator and their integration with an electro absorption modulator or photorefractive real-time hologram on one slab. (6) Compact design of the matched-amplification or matched-switch joint transform correlator. (7) Image rotator and the possibility of new novel improvement.

The matched-amplification and the matched-switching are the key components in the new system's design. Both are utilized for cleaning either the input's images or templates form clutter, noise, or unnecessary templates from the multiplexed templates fed into the optical correlator.

The Matched-amplification device was originally demonstrated proposed by a group at Rockwell, and it was used only to enhance certain features in images (T. Y. Chang , J. Hong and P. Yeh, "Spatial amplification, Opt. Letts, 15, 743–745 (1990). In this device the Fourier transform of a signal image were amplified by a the Fourier transform of a reference image in a photorefractive two beam coupling arrangement. Here I extend the use of this device for cleaning out of images from their noise and clutter, further more I illustrate how it is possible to set this device to be exactly operating as an adaptive Wiener filter. Applications and operational conditions which were not considered by Chang et. al.

FIGS. 2(a), and 2(b) illustrate the two-beam coupling and the matched amplification via a photorefractive two-beam coupling. In two-beam coupling FIG. 2(a), when two coherent beams 201 (strong reference beam) and 203 (weak signal beam) interact within a photorefractive crystal 205, they interfere (*Introduction to photorefractive nonlinear optics*, P. Yeh, Wiely (1993) and generate carriers. These carriers migrate, trapped and generate grating via the Electro-optic effect. This grating is shifted by π/2 with respect to the interference pattern. The presence of such a quarter-cycle phase shift in the refractive index makes possible a non-reciprocal steady state energy transfer between two beams. At the output the weak signal beam 203 at the input is amplified to produce a strong signal beam 207. The strong reference beam 201 at the input is de-amplified to produce a weak reference beam 209 at the output.

In matched amplification instead of amplifying a weak beam by a strong beam, the Fourier transformation of one image amplify selectively the Fourier transform of other image in order to achieve image clean up from noise and clutter. FIG. 2 (b) illustrate how this scheme operates. Input reference image "A" 211 (in the strong intensity reference beam 213) and a weak intensity noisy signal image templates "AB" 221 (In the weak intensity beam 222) are Fourier transformed by their respective Fourier transform lenses 215 and 223 into a photorefractive crystal 217. The Fourier spectrum of the reference image "A" 211 selectively amplifies the spectrum of the image "A" within the noisy signal image "AB" 221. After this selective spectrum amplification and Fourier transformation by the respective out put Fourier transform lenses 218 and 225, the template image "A" within the noisy signal image templates "AB" 221 becomes intense and clean out of clutter at the out put signal image 220. The image "A" 211 at the input becomes weak at the out put plane 227.

The matched amplification in photorefractive medium requires that the Fourier transform of the reference and the signal images interfere and write a hologram in the photorefractive medium. This makes the process of matched-amplification limited by the process of writing a hologram in a photorefractive medium (msec response-time). For some applications this speed is not satisfactory. Therefore, I propose here to replace the matched-amplification by a matched-switch device.

The architecture of the matched switching is essentially similar to that of the matched amplification. The InGaAsP controlled absorption modulator is the modulator utilized to illustrate the matched switching. Hence, the operational mechanism of this modulator is going to be illustrated first.

FIG. 2(c) shows a schematic diagram of controlled absorption InGaAsP modulator (K. J. Ebeling, *Integrated Opt-electronics. Waveguided Optics Photonics*, Springer-verlag, Chapter 12, Opto-electronics modulator, Pages 466–470. W. Kowalsky and K. J. Ebeling. Opt. Letts, Vol 12, 1053–1055 (1987). The modulator 240 consists of an epitaxial layer of InGaAsP 237 grown in InP substrate 231. A test $I_t$ beam of wavelength 1.3 um lies at the band edge of the quaternary layer of $In0._{73}Ga0._{27}As_{0.64}P0._{36}$ is incident on the controlled absorption modulator. The absorption coefficient of the epitaxial layer 237 at this wavelength is about 6000 $cm^{-1}$. This beam is partially absorbed in the epitaxial layer but passes thought the InP substrate 231 without further attenuation because of the smaller band gap wavelength of the InP substrate viz $\lambda_g$. A shorter wavelength modulated control reference beam 229 with a wavelength $\lambda_c$ is superimposed on the test signal beam 235. It is absorbed in the epitaxial layer and generates excess charge carriers, which cause a change in the transmission of the test signal beam 235. Time variation in the control reference beam 229 is transferred with no distortion to the test beam 235.

In the matched switching instead of switching a transmitted beam by the a control beam, the Fourier transformation of reference image in the control reference beam selectively switch the Fourier transform of signal image in the transmitted beam.

FIG. 2(d) illustrate how this scheme operates. Reference image "A" 241 (in the control reference beam Ic 243) and noisy signal images templates "AB" 255 (In the transmitted signal beam 256) both are Fourier transformed by their respective Fourier transform lenses 245 and 257 into a controlled absorption modulator 250. The Fourier spectrum of the image "A" 241 selectively switch the spectrum of the template image "A" within the signal image templates "AB" 255. After this selective spectrum switching and Fourier transformation by the respective output Fourier transform lenses 245 and 257, the template image "A" within the noisy signal image templates "AB" 255 is what is mostly transmitted as indicated at the out image 253 in the output transmitted beam 251. The reference image "A" 241 in the control beam is absorbed as indicated in the faint reference image "A" 253 at the outPort transmitted beam $I_t$ 251

For the first order approximation, both matched-amplification and matched-switching apparently can be set to function as a Wiener filter. Wiener filters have been used for several decades in retrieving signal from blurred noisy information.

The matched-amplification is implemented using a real-time hologram, and requires that both reference and signal beams to be coherent, in contrast, matched switching is implemented using a controlled absorption modulator 250 and doesn't require the beams to have the same wave length neither lenses with same focal lengths. Though both real-time holography and controlled absorption modulators both belong in a one category of light controlled by light modulators. (an optically addressed spatial light modulator)

Both of these devices (matched-switch and matched amplification) can be utilized to provide ultra fast filtering of noise, clutter, and none-matching templates in optical correlation systems. These two devices can be integrated within a correlation system to produce two new correlation devices the matched-amplification and matched-switch joint transform correlator (MAJTC and MSJTC).

FIG. 3(a) shows the proposed scheme for matched-amplification joint transform correlation. In this configuration the signal S 300 which is imbedded in noise, and the reference R 302 signal, are both Fourier transformed via a lens 305 into a slab 317 of a Photorefractive crystal 307, polarizer 309, and spatial light modulator 311. The spatial light modulator can be addressed either optically or electronically via an appropriate correlation filter. However, the simplest design of the spatial light modulator is a binary spatial modulator. Therefore this should make the binary phase-only filter the simplest correlation filter to use within the system.

The crystallographic orientation of the crystal is adjusted so that the Fourier spectra of the reference signal R amplifies the Fourier spectra of the contaminated signal beam S. After amplification the output of the crystal at the critical beam ratio $m=e^{\Gamma L}$ is almost equivalent to the Wiener filtered version of the input. In photorefractive materials of the 44 mm symmetry, the gained component and the back ground component have different polarizations L. J. Cheng and P. Yeh, "*Cross-polarization beam coupling in photorefractive GaAs crystal,*" Opt. Letts. 12. 705–707 (1987), L.-J. Cheng, G. Gheen, T. H Chao, H. K. Liu, A Partovi, J. Katz and E. M. Garmire, "*spatial light modulator by beam coupling in GaAs Crystlas,*" Opt. Letts 12, 705–707 (1987), which means that by using a polarizer 309 it is possible to separate them. After separation, the output out the crystal goes to spatial light modulator 311 built on the same slab, The total output of the of the slab is Fourier transformed via a lens 313 to produce the output at plane 315 which is prefiltered with a matched-amplification filter.

The matched-switch correlation approach is similar to matched amplification with some modification. The photo-refractive crystal 307 of the slab 317 in FIG. 3 (a) is replaced by a control absorption modulator(components 323+324) in the slab 333 in FIG. 3 (B). The input beam 301 in FIG. 3(a) is replace with two read out beams 316 and 317. Each of the beam can have different wavelengths depending on the electro-absorption modulator used in the design. In this correlation implementation, using the reference image R 318 and the signal image S 320 it may be is necessary to scale differently in order to make the Fourier spectra match each other in the out put. Other alternatives can set the reference image R 318 and the signal image S 320 in different input planes or to replace the lens 305 by synthesized lens 321 with two focal lengths.

In recent years there has been extensive study in optical holographic storage. A group at Caltech led by D Psaltis has demonstrated that is possible to achieve 3600 correlations per sec. In this scheme, the reference information was addressed from the holographic storage to a binary spatial filter, which was addressed by the signal K. Curtis and D. Psaltis, "3-dimensional disk based optical correlator," Opt. Eng. 33, 4051–4054 (1994). Here is used similar techniques, but instead of correlation by one single image coming from the holographic storage to the correlation filter, We correlate 10 to one hundred images simultaneously, coming from the holographic storage or image multeplixer into the slabs illustrated above. In the first stage matched application is achieved which means only the appropriate reference signal is amplified and the rest is filtered out. The clean signal goes to the spatial light modulator to correlate with the information stored in the correlation filter. So far it was described the operational principles of the matched amplifications switch corerlator. The goal is to construct a noise robust ultra fast compact correlator. Both noise robustness and speed were discussed. In this section is illustrated how it is possible to built an integrated correlator. For building the integrated correlator, firstly it is necessary to integrate the matched-amplification or the matched-switch devices with correlation filter device as single one component, further for better performance it is better to separate the amplified component from the back ground component. Because the amplified component has orthogonal polarization compared with original input component. Then it possible to add a polarizer to separated them. Therefore all the mentioned components can be integrated on one single slab. Further compactness in the design the input Fourier transform lens can be integrated in the input plane of the correlator, and the lens of the output (second lens) can be integrated with the slab described above.

These device can be integrated in numerous methods using various materials. However, due to the relative simplicity in the integration of controlled absorption modulator or photorefractive based materials made from III–IV family, with spatial light modulator made from similar semiconductor family. Here is illustrated an integration based on using Franz-Keldysh effect based spatial light modulator. However, other integration possibilities are also feasible.

Two forms of integrated slabs are presented: (a) the holographic-spatial light modulator slab, (b) the control absorbtion-spatial light modulator slab. The integration is illustrated with Franz Keldysh Fabrey-Perot spatial light modulator. However, alternative integration with other spatial light modulators or smart integrated structures is also feasible. Before to illustrate the structure of these slabs, first is illustrated Franz-Keldysh effect based spatial light modulator.

Figure 4:
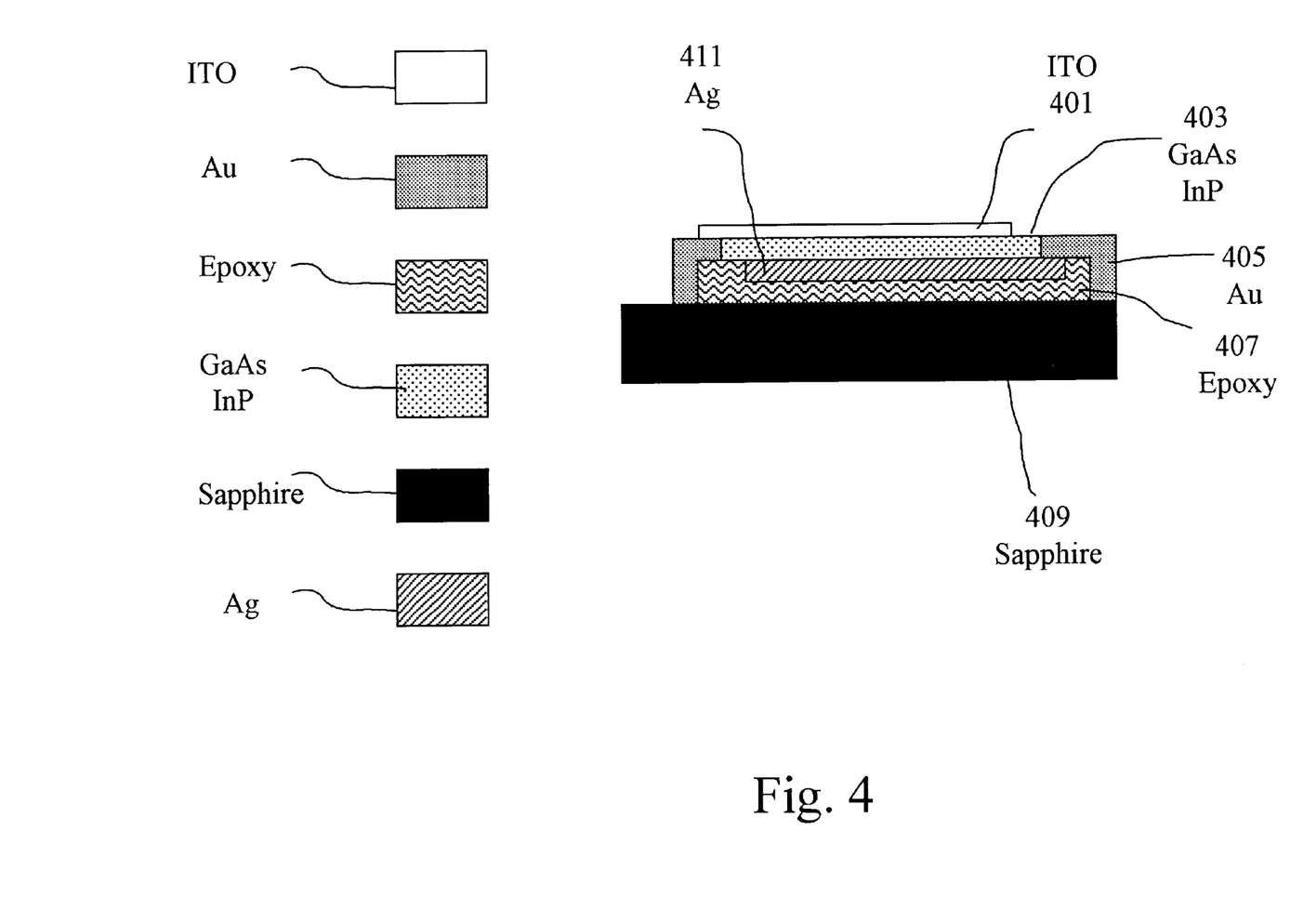
FIG. 4: High contrast optical modulator using Franz-Keldysh effect in thin film of GaAs.
Figure 5:
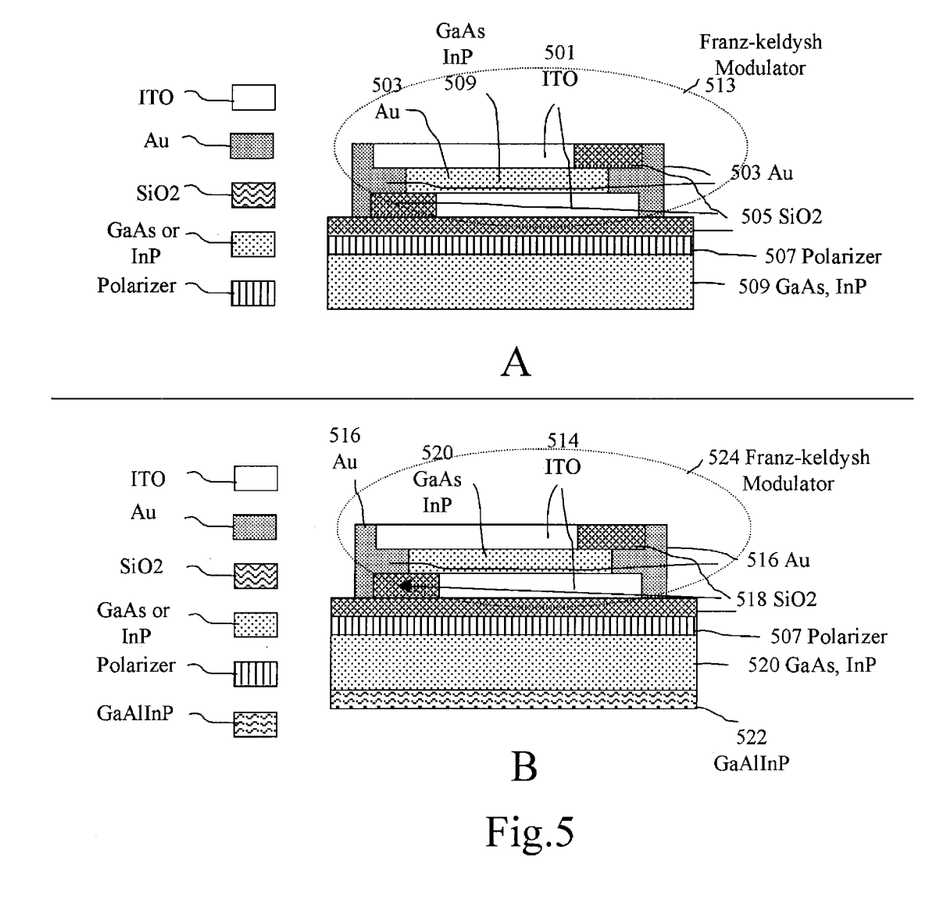

FIG. 4 shows a schematic diagram of Franz-Keldysh effect based spatial light modulator according to reference 41 Parvis Tayebati "High contrast, high reflectivity, optical modulator using the Franz-Keldysh effect in thin film of GaAs," AppL. Phys. Letts, 63, 2878–2880 (1993). This device consists of thin undoped GaAs 403 grown commercially on an etch-stop $Al_{0.8}Ga_{0.2}As$ layer. A thin silver electrode mirror 411 is spottered on a 25 mm$^2$ square sample. The silver layer (with refractive index of 0.12–6.08, provides a uniform spectral reflectivity and allows efficient heat removal. The above structured layer is epoxied 407 (epoxying) to a sapphire substrate 409. The GaAs substrate and GaAlAs layer are selectively etched and replaced by contacting to the silver electrodes. A thin layer of indium tin oxide 401 (ITO) is spottered on the sample. This layer plays the double role of the top electrode and partial mirror. The device operates that, the large electro-absorption and electorefraction due to the Franz-Keldysh effect can change the transmissivity or the reflectivity FIG. 5(a) shows the slab integrating a real-time hologram of Photorefractive GaAs and high contrast optical modulator using the Franz-Keldysh effect in thin film of GaAs: All fabricated on the same substrate. Two intermediating layers between the GaAs 509 and the spatial light modulator r 513 are constructed, the first is a polarizer 507, and the second is an insulating material of $SiO_{20}$. 505 The function of the polarization layer 507 is to separate the light coming from the reference and the signal beam, because these two components have different polarizations. An optically addressed spatial light modulator using these techniques has already been demonstrated. The insulating layer of $SiO_{20}$ 505 is added here in order to provide an opportunity for applying an external field on the phoreferactive crystal and to achieve high amplification. The Ag electrode 411 In FIG. 4 is replaced by the transparent ITO layer 501

FIG. 5(b) shows the slab integrating controlled absorption modulator with a Franz-Keldysh effect modulator. This slab has essentially the same structure as the previous slab except that the real-time holographic material of GaAs or InP is replaced by an epitaxial layer of controlled absorption of InGaAsP 522 modulators grown on InP substrate or GaAs. Since the substrate is InP, then the high contrast optical modulator using the Franz-Keldysh effect in a thin film of GaAs can be replaced by one which is fabricated using InP.

These devices can be integrated further in a compact structure of an optical correlator. The compact structure of an integrated joint-transform correlator is shown in FIG. 6, the first lens 305 and the input spatial light 303 in FIGS. 3(a) and 3(b) are combined on the front surface 602 of a cubic (or orthorhombic) beam splitter 615. Furthermore, the first lens in the correlator (e.g 305 in FIG. 3(a) or 321 in FIG. 3(B) can be replaced in front surface of the cubic (or orthorhombic) beam splitter by a Fresnel lens 603 integrated on the spatial light modulator. On the second surface of the cubic beam splitter, the slab 317 in FIG. 3(a) (The slab of real-time hologram, polarizer, spatial light modulator or the slab 333 in FIG. 3(b) (The slab of controllable absorber-spatial light modulator and polarizer) and the second lens of the correlator 313 and 329 in FIG. 3(a) and FIG. 3(b) are all combined by integrating a reflection Fresnel lens 611 with the slabs. (See also FIG. 5(a) and FIG. 5(b)). This correlator can be made less compact via letting the detector array 613 to be a one focal length away from the other surface of the cubic beam splitter (e.g to be in the position 614).

For correlation with many images, it is not efficient to feed the input images one by one. The new additional processes in this corelators (matched switching or matched amplification prior to the correlation process) should allows to feed many multiplexed images simultaneously. Feeding many images simultaneous would be extremely difficult or impossible with out the matched amplification or matched-switch.

The multiplexed information can be fed in either from electronically/optically addressed spatial light modulator, or from holographic storage. The latter approach is relatively faster using the current technologies. Also for feeding the information in, one may need to rotate the multiplexed image in all directions. Even though this step can be done easily through digital, techniques, however recently there were some reports in optical image rotation in time range of uses. Such a speed is impossible to defeat with the current digital technology. Here it is illustrate how to make fast image rotation and how to feed the information from optical holographic storage.

The common way to achieve image rotation is to use a Dove prism FIG. 7(a). The image rotation is achieved by rotating a Dove prism mechanically. In FIG. 7(a) the image "P" 701 is images via a lens 703 in to a rotating Dove prism 705. The light, which emerges of the lens 707 is images into the output to produce the rotated version of the input image "P" 709. Chiou and Yeh (40) demonstrated image rotation using Dove prism.

Other groups demonstrate that is possible to perform image rotation using two acousto-optic detector and cylindrical mirror. This approach is essentially based on the analysis of the conventional Dove prism. As shown in FIG. 7(a) the Dove prism can be divided into three parts shown in FIG. 7(b): the first part is a wedge prism 714 to direct the incident beam to the bottom (or the top) of the second part 716, which functions as a mirror. The third part 718 is another wedge prism to align the beam along the original direction. All these parts rotate together.

FIG. 7(C) shows the acousto-optic approach for image rotation. In this approach each of the first 714 and the second prism 718 in FIG. 7(b) are replaced by two pairs of cascaded acousto optic deflectors. One acousto optic deflectors for the X direction and the other for the Y direction, The firs pair is shown by the component 728 and the second is shown by the component 732 in FIG. 7 (C). The reflecting mirror, the second part of Dove prism 716 in FIG. 7(b) is replaced by a cylindrical mirror 730 In FIG. 7(c). However, to prevent unwanted distortion owing to the curvature of the circular mirror surface, the cylindrical mirror is discreteized to multiple facets. FIG. 7(c) illustrates this scheme This image rotator can be improved in terms of operational speed or Image quality. For enhancing the speed the acousto-optic modulator can be replaced with Electro-optic deflector. For improving the image quality the acousto optic modulator can be replaced with beam steering devices based on liquids crystals.

For feeding the information in, in the last decade It has been demonstrated that it possible to store and multiplex up to 10000 images in one hologram. These image multiplexers can be used to store the correlator's reference templates. Two forms of image multiplexer are suitable for fast feed in the information (shift multiplexing )Demetri Psaltis, Michael Levene, Allen Pu and George Barbastathis, Kevin Curtis "Holographic storage using shift multiplexing," Opt. Letts, 20, 782–784(1995 and Peristrophic multiplexing) K. Curtis, A. Pu and D Psaltis, "Method for holographic storage using peristrophic multiplexing," Opt. Letts. 19, 993–994(1994). However for a reconfigurable system it is better to use images multiplexed on spatial light modulator.

Matched amplification at beam ratio=exp (Γl) is essentially a Wiener filter (Γ is the coupling coefficient of the material L is the crystal thickness). In order to prove this, let as assume that we have the configuration of two beam coupling in which in the reference beam $A_1$ we have the signal, and in the object beam (beam $A_2$) we have the signal which is imbedded in noise. In this configuration both the object and the reference signal are Fourier transformed via a lens into a photorefractive crystal, the crystal is oriented in a such a way that the energy is transferred from the Fourier transom of the signal to the Fourier transom of the reference beam.

Then the output from the crystal can be written as:

$$output = A_2(S+N)\sqrt{\frac{1+mX^2}{1+mbX^2}}$$

Where X is defined as $$x = \frac{S}{S+N}$$

What is inside the square root can be written in the following form $$\sqrt{\frac{1+mx^2}{1+mbx^2}} = \frac{1}{b}\left[1+(b-1)\frac{1}{1+mbx^2}\right]$$

$$= \left[1+\frac{1}{2}\left(\frac{1}{b}-1\right)\frac{mbx^2}{1+mbx^2} - \frac{1}{8}\left(\frac{1}{b}-1\right)\frac{mbx^2}{1+mbx^2}\right]^{1/2}$$

For ΓL Positive $1\backslash b-1<1$, therefore the above term can be expanded to be $$1+\frac{1}{2}\left(\frac{1}{b}-1\right)\frac{mbx^2}{1+mbx^2} - \frac{1}{8}\left(\frac{1}{b}-1\right)^2\left(\frac{mbx^2}{1+mbx^2}\right)^2$$

In photorefractive materials of the 4 mm symmetry, the first term, and the high order terms have different polarizations, which make it possible to separate the first terms from the higher terms.

Let assume that a separation from the first order and the higher orders has been achieved, and the contribution of the third order to the second order is negligible, then the output from the crystal can be written as $$A_{out} = A_2(S+N)\frac{(|S|/|S+N|)^2}{1+mb(|S|/|S+N|)^2} =$$

$$mA_2(S+N)\frac{|S|^2}{|S+N|^2+mb|S|^2}$$

For a signal that is highly contaminated within a noise, it is possible to approximate the above equation in the following form:

$$A_{out} = mA_2(S+N)\frac{|S|^2}{|N|^2+mb|S|^2}$$

At the critical beam intensity ratio $m=e^{\Gamma L}$, the output from the crystal becomes, $$A_2 e^{\Gamma L}(S+N)\frac{|S|^2}{|S|^2+|N|^2}$$

In similar manner it is possible to prove also that matched switching using controlled absorption spatial light modulator is also equivalent to the wiener filter.

In controlled absorption modulator, the change in the transitivity of the transmitted beam as a result of adding the control beam Ic is given by:

$$\frac{\Delta t}{t} = \frac{t(I_c)-t(I_c=0)}{t(I_c=0)} = \frac{\alpha(\lambda_t)d\langle\Delta n\rangle}{n_0+\langle\Delta n\rangle + N_c\exp\left(\frac{hc/\lambda_t-W_g}{kT}\right)}$$

Where $<n>=I_c\tau/Ah\Omega_s d$, $\tau_s$ is the charge carrier response time, h is blank coefficient, K is Boltzman constant, Wg is the energy gap of the material Let as assume that in the configuration of controlled absorption InGaAsP modulators that the reference beam (the control beam) Ic has the signal, and in the object beam (beam $A_2$) It has the signal which is imbedded in a noise. Also let us assume that the object in the reference $$\frac{\Delta t}{t} = \frac{\alpha(\lambda_t)dw_1|S|^2}{w_1|S|^2+n_0+N_c\exp\left(\frac{hc/\lambda_t-\omega_g}{kT}\right)}$$

beam is scaled adjusted, so the Fourier order in the reference and the signal beam correspond to the same special frequencies. Since $<\Delta n> \propto |S|^2$, then the relative change in the transmissivity is given by $w_1$ is proportionality weighing factor depends on the wavelength and the material characteristics Since either $n_o$ and $N_c$ are homogeneously distributed on the sample, and have no dependence on the intensity of the signal beam, then, for additive Gaussian noise, both $n_o$ and $N_c$ are proportional to the distribution of the additive noise. For signals imbedded in a white additive noise, it is possible to prove that $$\frac{\Delta t}{t} = \frac{\alpha(\lambda_t)dw_1|S|^2}{w_1|S|^2+w_2\langle N\rangle^2}$$

Where $w_1$ and $w_2$ are weighing factors. It is possible to adjust the input beam ratio so that $w_1=w_2$, and hence the change in the transmissivity becomes equivalent to Wiener filtering.

I claim:

1. A matched amplification image processor for converting a noisy cluttered image into a clean image comprising:
   (a) a real time holographic two-beam photorefractive coupling device;
   (b) a signal image source for producing a first coherent light beam bearing said noisy cluttered image;
   (c) a reference image source for producing a second coherent light beam bearing a reference image thereon, said second light beam having an intensity substantially greater than the intensity of said first coherent light beam bearing said noisy cluttered image;
   (d) input Fourier transform means for causing Fourier transforms of said first and second light beams to interfere and produce real time holograms upon said real time holographic two-beam photorefractive coupling device; and (e) output Fourier transform means, optically coupled to said real time holographic two-beam coupling device, for producing a clean image of said noisy cluttered image.

2. The image processor of claim 1 wherein a beam intensity ratio m of said second coherent light beam divided by said first coherent light beam is equal to exponent(gamma L), where L is the thickness of photorefractive material of said holographic two-beam photorefractive coupling device, and gamma is the coupling coefficient of the photorefractive material, thereby to approximate Weiner filtering.

3. The correlator of claim 1 wherein said real time holographic two-beam coupling device includes a photorefractive crystal wherein its crystallographic orientation is adjusted so that the Fourier spectra of the reference signal amplifies the Fourier spectra of said noisy cluttered signal beam.

4. A matched switching image processor for converting a noisy cluttered image into a clean image comprising:
(a) a controlled absorption modulator;
(b) a signal image source for producing a first light beam bearing said noisy cluttered image;
(c) a reference image source for producing a second light beam bearing a reference image thereon;
(d) input Fourier transform means for directing Fourier transforms of said first and second light beams upon said controlled absorption modulator; and
(e) output Fourier transform means optically coupled to said controlled absorption modulator for producing a clean image of said noisy cluttered image.

5. The image processor of claim 4 wherein said controlled absorption modulator comprises beam control layers for selectively switching the Fourier transform of a portion of said noisy cluttered image corresponding to the reference image through said controlled absorption modulator.

6. The image processor of claim 5 wherein said controlled absorption modulator includes epitaxial semiconductive materials in the III–V family.

7. The image processor of claim 6 wherein an input beam ratio between a first input light beam Ic and a second input light beam It is adjusted to make the change in transmissivity equivalent to Weiner filtering by making $w_1 = w_2$, where w1 is weighting factor proportional to the intensity Ic, and $w_2$ is a weighing factor proportional to Nc exp $\{(hc/\lambda_t - W_g)/KT\}$, where h is the blank coefficient, K is a Boltzman constant, $W_g$ is the energy gap of the material, $\lambda_t$ is the wavelength of the transmitted beam, and c is the speed of light in a vacuum.

8. The image processor of claim 6 wherein said controlled absorption modulator comprises epitaxial InGaAsP.

9. The image processor of claim 5 wherein an input beam ratio between a first input light beam Ic and a second input light beam It is adjusted to make the change in transmissivity equivalent to Weiner filtering by making $w_1 = w_2$, where w1 is weighting factor proportional to the intensity Ic, and $w_2$ is a weighing factor proportional to Nc exp $\{(hc/\lambda_t - W_g)/KT\}$, where h is the blank coefficient, K is a Boltzman constant, $W_g$ is the energy gap of the material, $\lambda_t$ is the wavelength of the transmitted beam, and c is the speed of light in a vacuum.

10. The image processor of claim 4 wherein an input beam ratio between a first input light beam Ic and a second input light beam It is adjusted to make the change in transmissivity equivalent to Weiner filtering by making $w_1 = w_2$, where w1 is weighting factor proportional to the intensity Ic, and $w_2$ is a weighing factor proportional to Nc exp $\{(hc/\lambda_t - W_g)/KT\}$, where h is the blank coefficient, K is a Boltzman constant, $W_g$ is the energy gap of the material, $\lambda_t$ is the wavelength of the transmitted beam, and c is the speed of light in a vacuum.

11. A matched amplification image correlator for correlating a noisy cluttered image with a reference image comprising:
(a) a real time holographic photorefractive two-beam coupling device;
(b) a signal image source for producing a first coherent light beam bearing said noisy cluttered image;
(c) a reference image source for producing a second coherent light beam bearing said reference image thereon;
(d) first Fourier transform means for causing Fourier transforms of said first and second light beams to interfere and produce a real time hologram upon said real time holographic two-beam coupling device;
(e) a spatial light modulator, optically coupled to said real time holographic two-beam coupling device, for modulating said real time hologram with a correlation filter to produce a modulated signal; and
(f) second Fourier transform means, optically coupled to said spatial light modulator, for transforming said modulated signal to produce an output correlation signal indicative of correlation between said noisy cluttered image and said reference image.

12. The correlator of claim 11 including a polarizer optically coupled between said real time holographic storage device and said spatial light modulator for enhancing separating matched components from background components.

13. The correlator of claim 12 wherein said real time holographic two-beam coupling device includes a photorefractive crystal wherein its crystallographic orientation is adjusted so that the Fourier spectra of the reference signal amplifies the Fourier spectra of said noisy cluttered signal beam.

14. The image processor of claim 12 wherein a beam intensity ratio m of said second coherent light beam divided by said first coherent light beam is equal to exponent(gamma L), where L is the thickness of photorefractive material of said holographic two-beam photorefractive coupling device, and gamma is the coupling coefficient of the photorefractive material, thereby to approximate Weiner filtering.

15. The correlator of claim 11 wherein said real time holographic two-beam coupling device includes a photorefractive crystal wherein its crystallographic orientation is adjusted so that the Fourier spectra of the reference signal amplifies the Fourier spectra of the noisy cluttered signal beam.

16. The image processor of claim 11 wherein a beam intensity ratio m of said second coherent light beam divided by said first coherent light beam is equal to exponent(gamma L), where L is the thickness of photorefractive material of said holographic two-beam photorefractive coupling device, and gamma is the coupling coefficient of the photorefractive material, thereby to approximate Weiner filtering.

17. A matched-switching image correlator for correlating a noisy cluttered image with a reference image comprising:
(a) a controlled absorption modulator;
(b) a signal image source for producing a first light beam bearing said noisy cluttered image; (c) a reference image source for producing a second light beam bearing said reference image thereon;
(d) input Fourier transform means for causing overlapping Fourier transforms of said first and second light beams to be projected upon said controlled absorption modulator;
(e) a spatial light modulator, optically coupled to said controlled absorption modulator, for modulating an output signal of the controlled absorption modulator with a correlation filter to produce a modulated signal; and (f) output Fourier transform means, optically coupled to said spatial light modulator, for producing an output correlation signal indicative of correlation between said noisy cluttered image and said reference image.

18. The correlator of claim of claim 17 including polarizer means optically coupled between said controlled absorption modulator and said spatial light modulator for enhancing separating matched signal components from background signal components.

19. The image processor of claim 18 wherein said controlled absorption modulator comprises beam control layers for selectively switching the Fourier transform of a portion of said noisy cluttered image corresponding to the reference image through said controlled absorption modulator.

20. The image processor of claim 17 wherein said controlled absorption modulator comprises beam control layers for selectively switching the Fourier transform of a portion of said noisy cluttered image corresponding to the reference image through said controlled absorption modulator.

* * * * *